Patented Feb. 24, 1925.

1,527,569

UNITED STATES PATENT OFFICE.

NATHAN MARCUS, OF WEST HOBOKEN, NEW JERSEY.

ANTISKID ELEMENT FOR TIRES OF AUTOMOBILES.

Application filed March 31, 1921. Serial No. 457,169.

*To all whom it may concern:*

Be it known that I, NATHAN MARCUS, a citizen of the United States, residing at West Hoboken, in the county of Hudson and State of New Jersey, have invented certain new and useful Improvements in Antiskid Elements for Tires of Automobiles, of which the following is a specification.

My invention relates to a new and improved anti-skid element for the tires of automobiles.

It is well known that many accidents have been caused by the slipping of rubber tires, especially upon wet or oily roadways and numerous devices have been suggested for increasing the grip of the tire upon the road. These devices have been efficient to a certain extent, but they have all injured both the road and the tire.

According to my invention a new and improved anti-skid element is provided which powerfully increases the grip of the tire upon the road without any substantial injury thereto.

One of the objects of my invention is to provide such an element, the parts of which are rigidly connected to each other so as to prevent any relative movement between them when the device is acting.

Another object of my invention is to provide an element which is substantially restrained from any lateral movement with respect to the tire.

Other objects of my invention will be set forth in the following description and drawings which illustrate a preferred embodiment thereof.

Figure 1:
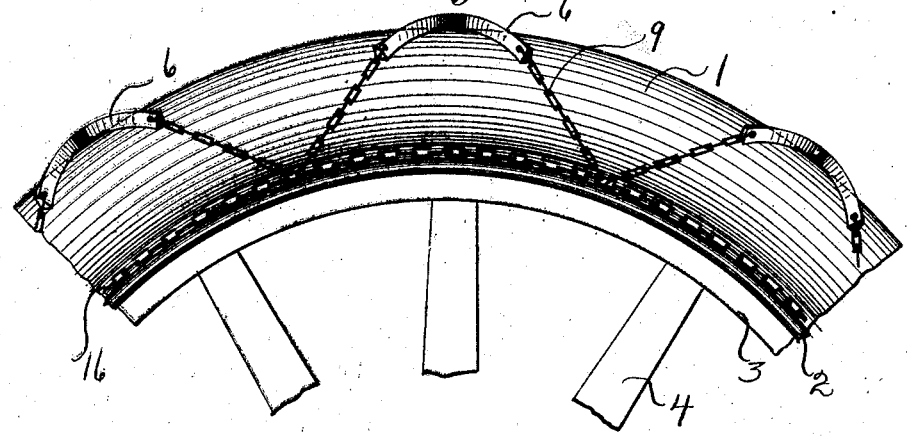
Figure 1 is a side view showing one embodiment of my invention.

The tire 1 is mounted upon the rim 2 secured to the felly 3 having the spokes 4, in any well known manner. These features are not illustrated in detail because in themselves they form no part of my invention. The tire 1 is of the well known type having beads by means of which the tire is held in position in the well known manner.

The improved anti-skid element 6 consists of two arcuate members of substantially the same shape and made of some rigid material such as metal. Cast or forged steel are suitable for the purposes of this invention. The two arcuate portions are cast or forged or welded together at the apex 7 of the element and the anti-skid element has eyes or perforations 8 to which the links 9 of the holding chains are secured.

Figure 2:
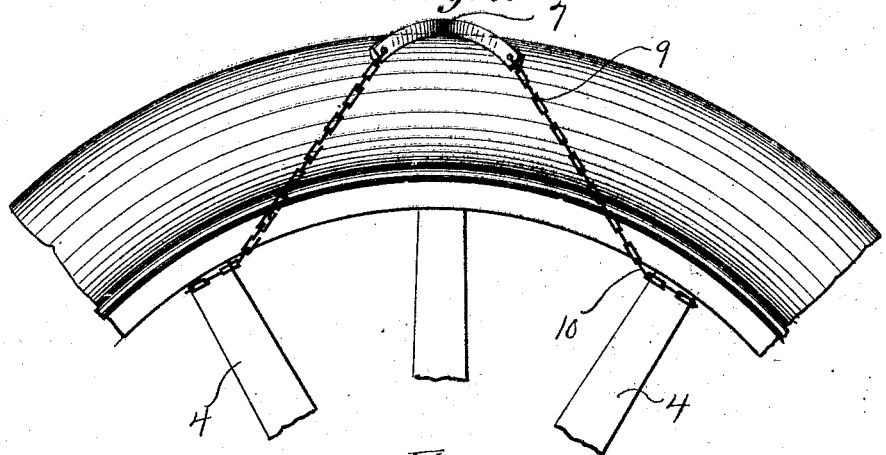
Figure 2 is a side view showing another embodiment of my invention.
Figure 3:
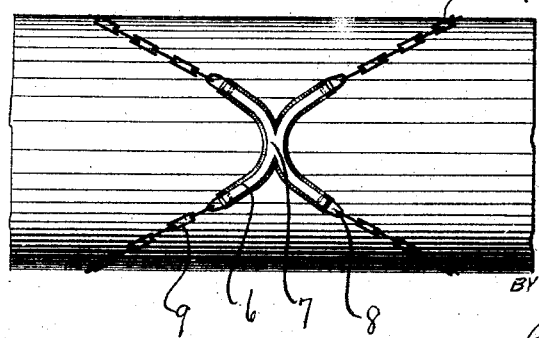
Fig. 3 is a top view.

It will be noted from Figures 1 and 2 that the two halves of the anti-skid element are curved in two directions from the apex 7, that is, when the element is in place, the two halves thereof are curved towards the center of the tire as well as being laterally curved and for the purposes of this specification, these two curvatures may be respectively called the radial curvature and the circumferential curvature.

It will also be noted that when the element 6 is held in place by the chains as shown in Figures 1 and 2, that the horseshoe-like halves thereof snugly embrace the tire on both sides of the outermost circumferential line thereof. The curvature of the tire is such that all parts of the anti-skid element 6 contact with the tire so that when the chains are pulled taut as in the embodiment shown in Figure 2, any substantial rocking or lateral movement of the anti-skid element is prevented. The underside of the anti-skid element is smooth so that it does not cut into the tire, the curvature of the underside of the anti-skid element preferably corresponding to the curvature of the tire upon which it is to be used. Of course, these anti-skid elements can be made in different sizes and with different curvatures corresponding to the tires upon which they are intended to be used.

In the embodiment shown in Figure 2, the chains 10 are secured to two of the spokes 4 in any suitable manner, this construction being for the purpose of assisting the movement of an automobile in some bad spot of the road. In the embodiment shown in Figure 1, two circumferential chains 16 are circumferentially secured on opposite sides of the tire adjacent the bight or hollow formed between the side walls of the tire and the beads thereof, and the end links 9 are secured to these chains 16 by any suitable locking means.

In the embodiment shown in Figure 1, the entire anti-skid structure consisting of the various members 6 and the chains 16, is therefore free to creep or move relatively to the body of the tire. Of course, if it is desired, chains 16 can be prevented from moving with respect to the tire 1 so as to prevent or minimize such a creep.

I have described a preferred embodiment of my invention but it is clear that numerous changes and omissions may be made without departing from its spirit as defined in the claim herein.

Thus in the embodiment before mentioned, the apex of the anti-skid element rests upon the tread portion of the tire and the curved end portions thereof are so formed, that they snugly embrace the said tread portion. The said end portions may embrace the tread portions rather loosely so as to permit a certain lateral movement perpendicular to the plane of the tire. Of course, the entire anti-skid device could be made so small that all parts thereof will rest upon the tread portion of the tire. Of course, if desired, the configuration of the anti-skid element could be such that it will only conform to that portion of the tire directly adjacent thereto when the anti-skid element is bearing the load on the tire.

If desired, the circumferential chains to which the anti-skid elements are secured can be connected by means of elastic radial members which are not illustrated in the drawings as they have been very widely used in connection with the well-known anti-skid chains.

I claim :—

An anti-skid element for tires which in plan comprises two arcuate members having their convex portions rigidly connected to provide a bearing portion adapted to extend transversely of the tire, the said element being curved to conform to both the transverse and circumferential curvature of the tire.

In testimony whereof I hereunto affix my signature.

NATHAN MARCUS.